United States Patent
Rice

[15] 3,666,252
[45] May 30, 1972

[54] APPARATUS FOR RAPID HIGH ENERGY REMOVAL OF SUPERFLUOUS PROJECTIONS

[72] Inventor: Edwin E. Rice, Ann Arbor, Mich.
[73] Assignee: Chemotronics, Incorporated, Ann Arbor, Mich.
[22] Filed: May 25, 1970
[21] Appl. No.: 40,992

[52] U.S. Cl. ........................................................266/2 R
[51] Int. Cl. ........................................................C21d 1/82
[58] Field of Search ......................148/9; 266/2 R, 2 A, 2.5; 72/56; 254/122, 126; 74/520; 18/DIG. 11

[56] References Cited

UNITED STATES PATENTS

| | | | |
|---|---|---|---|
| 3,252,312 | 5/1966 | Maier | 72/56 |
| 2,574,281 | 11/1951 | Olson | 74/520 X |
| 3,475,229 | 10/1969 | Geen et al. | 148/9 |

FOREIGN PATENTS OR APPLICATIONS

| | | | |
|---|---|---|---|
| 145,528 | 6/1962 | U.S.S.R. | 72/56 |

*Primary Examiner*—J. Spencer Overholser
*Assistant Examiner*—John E. Roethel
*Attorney*—Miller, Morriss, Pappas & McLeod

[57] ABSTRACT

A machine or apparatus for the rapid high energy (transient thermal) treatment of articles requiring removal of superfluous projections (burrs and the like) is described in which a closed chamber is formed by action of the device to contain the thermal energy and article. The closed chamber encloses void volumes adjacent to the surfaces of the articles having superfluous projections. Closure elements acting with an article support element are actuated in forming the closed chamber or vessel. At least one of the closure elements is movable for closure toward and away from the other closure element. Preferably the movable closure element actuates the article support element in a holder such that a closed chamber is formed around the article. The movable closure element moves the support element in the holder in forming the closed chamber such that when a transient thermal energy release is generated in the chamber the holder does not bear any direct loading from the energy release. Preferably, a combustible gaseous composition is injected under pressure into the chamber void space between the closed chamber cavity and articles and a rapid thermal energy release reaction is initiated after achievement of suitable charge pressure. The device of the present invention fully contains the shock of the rapid thermal energy release and the consequent pressure rise and the result of the confined chamber reaction is the removal of superfluous projections from the parts placed in the chamber. The device includes sealing means between the article support element and the closure element functioning to form the chamber. The sealing means is preferably a replaceable seal which is protected by a mated or precision fit of male and female parts between the seal and the chamber. Fuel passage means are also provided leading to the chamber cavity with valving securing the chamber against exhaust of the reaction products or residue during the reaction. The machine is adapted for sequential treatment of articles in tooling which forms the chambers and which tooling can be varied to accommodate different article space requirements. A coolant may be utilized for the tooling where required by the cycle rate of the device.

10 Claims, 4 Drawing Figures

PATENTED MAY 30 1972

INVENTOR
EDWIN E. RICE
BY
Miller Morris Pappas & McLeod
ATTORNEYS

3,666,252

APPARATUS FOR RAPID HIGH ENERGY REMOVAL OF SUPERFLUOUS PROJECTIONS

SUMMARY OF THE INVENTION

The process and equipment for treating mechanically shaped articles for manufacture is described in U.S. Pat. No. 3,475,229 granted Oct. 28, 1969, abandoned, divisional application Ser. No. 844,703 filed on May 28, 1969 and a copending continuation application Ser. No. 69,188, filed Sept. 2, 1970 of the divisional application. The process involves the removal of superfluous projections from such articles by treatment with transient elevated gaseous temperatures and pressures in a sealed and confined space.

The process referred to was found to work on resins, metals and other materials particularly where burrs or projections from forming, shaping or machining defy economic removal by other known means.

The process has required the development of apparatus to permit and facilitate the practice of the process in as flexible a manner as possible and with the capability of relatively high production. The device must withstand a wide range of pressures so as to contain the explosive pressures produced while subjecting the surfaces requiring treatment to the levels of transient thermal energy required to remove the superfluous projections.

In my copending application Ser. No. 690,524, filed Dec. 14, 1967, now U.S. Pat. No. 3,547,589 granted Dec. 15, 1970, a system of sequenced firing of closed vessels is described. The specific apparatus described is particularly suitable for purposes where closure is relatively slow because large amounts of material were being treated at one time. A need was still felt for a high rate machine which would handle the removal of superfluous projections.

Problems requiring solution in relation to rapid cyclic rate of thermal energy release containment were providing (1) a machine which could repeat results (2) a machine easy to rapidly load and unload (3) a machine adaptable to automatic work flow (4) a machine having adequate valve shielding and sealing (5) a machine reproducibly injecting combustible gaseous compositions under known volume, ratio and pressure conditions after closure, (6) a machine amenable to simple and economical change of chamber tooling to treat variations in parts configuration and number of treated parts per cycle and (7) a machine which is safe to use with the shock and explosive environment of the process.

Accordingly, the principal objects of the present invention are to provide a machine which solves the above problems while retaining relative simplicity for service and repair and capability for simple retooling to serve a wide variety of parts.

GENERAL DESCRIPTION

It has been found that by subjecting articles fabricated from a variety of materials to transient elevated gaseous temperatures and pressures in a sealed and confined space that superfluous projections consequent to forming, shaping or machining are removed. The phenomenon of removal is not restricted to external projections such as readily visible and accessible burrs, but actually extends to superfluous projections in internal orificing of parts so long as the surfaces including the projections are accessible to the transient elevated gaseous temperatures and pressures. This is of vital progressive significance in hydraulic, pneumatic and mechanical devices because it means that a complete internal and external removal of superfluous projections is possible in a single rapid operation and without damage to adjacent related and dimensioned surfaces. The removal contemplated in the present invention is accordingly selective and unlike grinding, brushing, polishing, lapping and chemical treatment, shot blasting and brunishing, the process is essentially self-limiting. In a sense the process can be viewed as a surface treatment process in which relatively small cross section projections are eliminated while the base or root dimensions of the article are left intact and unharmed.

Because the process usually involves high pressures (dependent in magnitude on the amount of thermal energy releasing material used), the provision of an apparatus to exploit the process requires careful consideration of safety requirements, accommodation of process requirements, flexibility to adapt to a variety of tooling forming the confined space while providing a reasonably high rate of productivity. The structure of the present invention achieves all of the immediate objectives to serve presently known process parameters.

Essentially two or more closure elements are provided in a machine frame. The frame is preferably a clevis type and must be capable of being closed, to define with a support element for the article and one of the closure elements a fully enclosed space capable of totally confining, without deformation, a high energy reaction generated in the enclosed space. Access means to the resulting chamber is required to communicate the energy containing fuel media to the space and to energize the fuel media. The media is gaseous in at least its energized condition so as to wholly permeate the enclosed space and to diffuse into and around parts or objects placed in the enclosed space and the gaseous media is in contact thereby with all superfluous projections. The supply conduits must be valved to separate the chamber from the supply source and appropriate sealing and support must be provided to buttress the tooling and to resist process failure as might occur with a premature reduction of pressure within the enclosed space. The closures and tooling or support means must be securely closed to confine the energetic transient shock waves and sequencing apparatus must allow the apparatus to repeat its performance and to expedite loading and unloading of parts to be treated. Preferably the support means or platform includes a member fitted to the corresponding opposite closure element with an interposed seal. Further it is preferred to provide a holder for the support means which is not directly loaded upon initiation of the thermal energy release. Coolant, as required, may be circulated to around or through the tooling forming the confined space, particularly where the apparatus of the present invention is subjected to repetitious action at high cyclic rates. In some instances, as for example, where superfluous projections are on the interior of a part, the part itself can be utilized as its own tooling and the cavity of the part becomes a rigid wall of the chamber in which the high transient pressure and heat accomplishes removal of the unwanted projections. The apparatus includes a machine base or frame having thrust receiving jaws or surfaces in opposed relation and the work chamber is closed and formed between these thrust buttresses.

The part to be treated is positioned in the confined chamber and those portions of the parts to be influenced by the process are positioned so that there is a void volume surrounding them which can be filled with the fuel material. This allows the thermal energy to function to remove the superfluous projections.

The strength of the chamber walls and associated tooling must be sufficient to rigidly withstand (including safety factor) the transient thermal effect and the pressure generated during treatment of particular material. Since the forces contained are explosive in character adequate support shielding is generally provided as an additional safety factor.

While the most frequent use of the present apparatus is found in treating integral or homogeneous parts, as say steel, the process and apparatus can accommodate composite assembled parts with variant materials, as for example steel with bronze or copper inserts.

SPECIFIC DESCRIPTION

Figure 1:
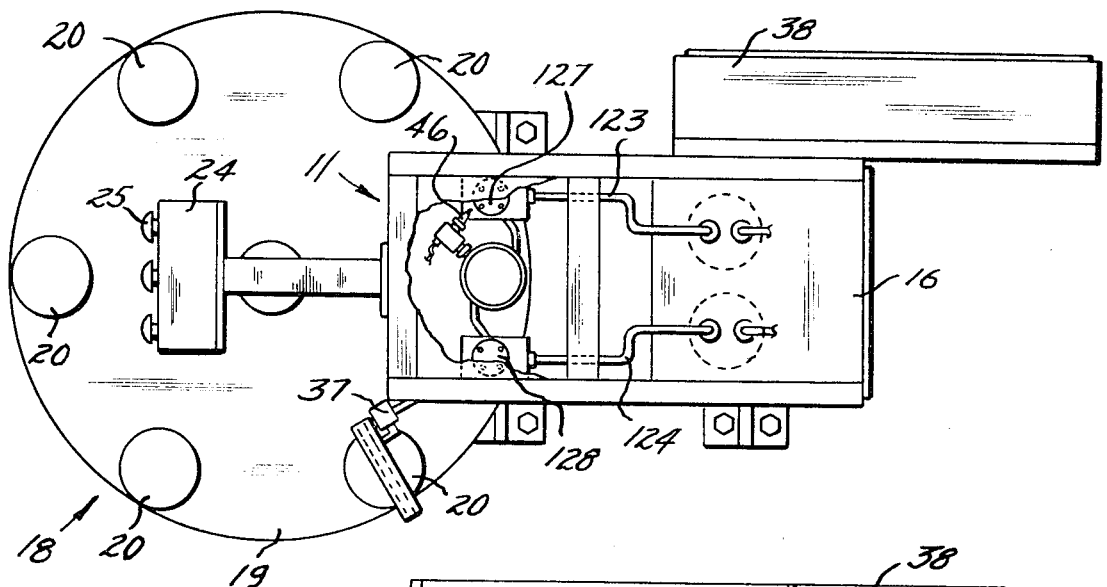
FIG. 1 is a top plan view of an apparatus for removal of superfluous projections in accord with the present invention.
Figure 2:
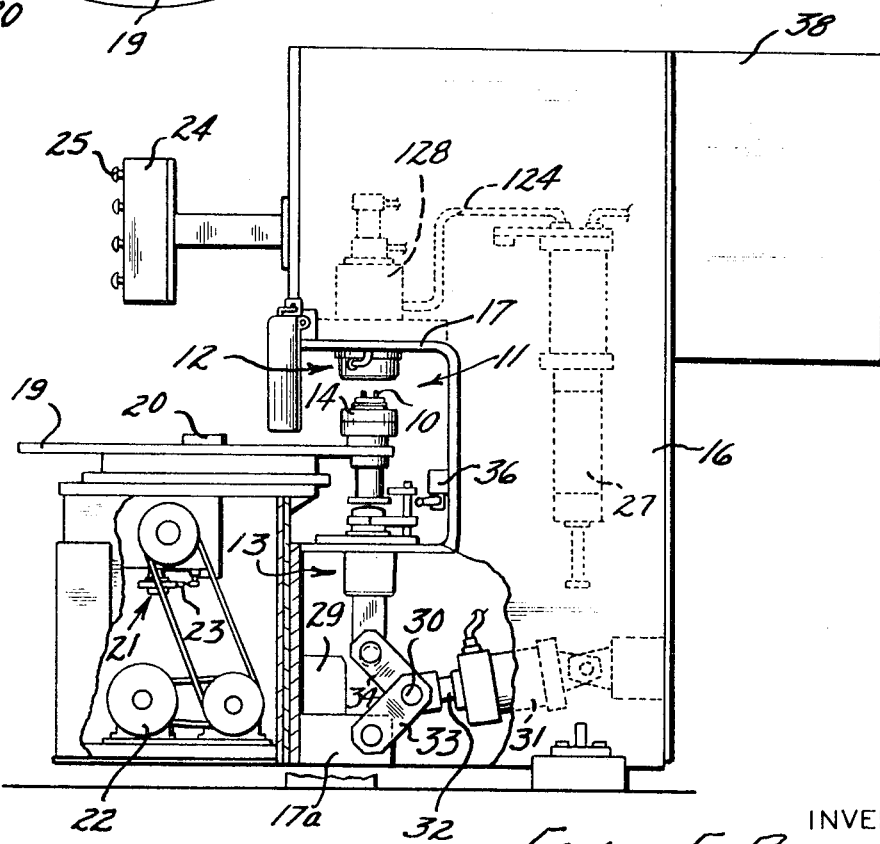
FIG. 2 is a side elevation view of the apparatus shown in FIG. 1 for application of transient high temperatures and pressures to parts to be treated.
Figure 4:
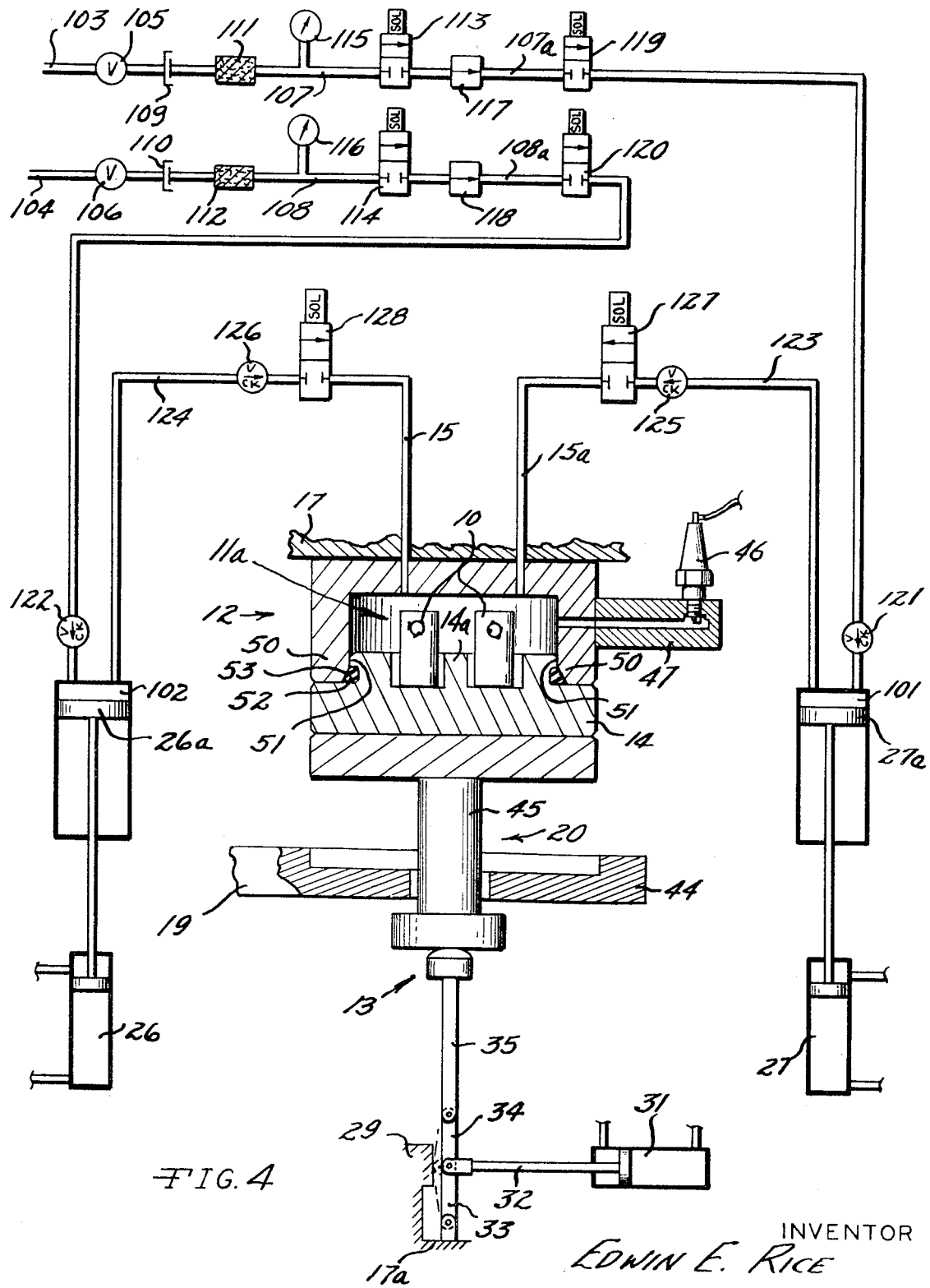
FIG. 4 is a partial schematic section view of the work station showing closure of the tooling and indicating the delivery passages for the gaseous high energy fuel, the combustion chamber lock, and the fuel energy release initiator.

In the FIGS. 1 and 2 a work station 11 is provided between a pair of closure elements 12 and 13 which registrably close on the work station 11 to define therebetween a confined chamber 11a (see FIG. 4) which is selectively opened and closed by action of the closure elements 12 and 13 moving relatively toward and away from each other. Usually the chamber, as will be subsequently seen, is defined by the walls of a removable tooling or support element or platform 14 which carries or supports work pieces 10 and the chamber is closed by selective contact with the closure elements 12 and 13. As will be seen one or more work pieces 10 are positioned in the tooling element 14 for ultimate confinement and treatment. Communicating passages 15 and 15a are provided through one of the closure elements 12 so as to provide for the introduction of a high thermal energy releasing gas into the sealed chamber 11a (FIG. 4). The gas, when ignited, exposes the chamber 11a to transient pressures and temperatures which are wholly confined by the tooling 14 and by the closure elements 12 and 13. The most expeditious manner to support the closure elements 12 and 13 is by mounting them in the machine frame 16 in a press-like relationship where the work station 11 is in the throat portion of the frame or clevis 16 and the mounting pads or thrust bearing portions or fixed jaws 17 and 17a provide stress transmission to the machine frame 16. When the closure elements 12 and 13 move relatively toward each other and close on the support element or tooling 14 they form a closed vessel or chamber 11a (FIG. 4). A work indexing structure 18 repetitively orients the tooling 14 and closing occurs incidental to moving the tooling 14 in its holder 19. This supports the vessel for a confined explosion while isolating the table 19 from direct shock or loading from the thermal energy release.

The work indexing element 18 is operably secured to the frame 16 and in cooperation with the frame 16 repetitively positions the receptacle or tooling 14 and/or work pieces 10 carried on the table 19 thereof in coaxial alignment and registry relation with and intermediate to the closure elements 12 and 13 and jaws 17 and 17a. As shown, the tooling support 14 and work indexing structure 18 comprises a rotating tooling holder in the form of a table 19 having a plurality of tooling holder stations 20. Each of the holder stations 20 include receptacles for tooling 14 and in other regards are similar to the work station 11 except that loading, unloading and processing may occur at the stations 20. The table rotating mechanism 21 and its connected poser source such as motor 22 is positioned beneath the table 19 and limit switch means 23 provides a means to accomplish sequencing control of the table 19 in synchronization with the operation occurring at the work station 11.

While the tooling support 14 and work indexing element 18 is shown as including a table 19 other indexing expedients are contemplated as well known in the art to repetitiously present tooling and work pieces 10 to the work station 11 in axial registry between the buttresses 17 and 17a with a dwell dependent upon the selected process interval within the work chamber formed upon closure of the tooling 14 as between the closure elements 12 and 13. Similarly, the cyclic rate may be manually selected or may be automatic, limited in unit dwell by the time to accomplish processing within the chamber formed at the work station 11 on closure.

The control console 24 extending over the table 19 is accessibly located for an operator and by manipulation of the appropriate push buttons 25 the operator can select manual sequencing or automatic and semi-automatic operation.

By reference to FIG. 4 in combination with FIGS. 1 and 2, the frame 16 also provides mounting means for the charging cylinders 26 and 27 which through conduits 123 and 124 respectively, urge gaseous fuel fractions, from separate sources, to admixture and pressurized delivery by the cylinders 26 and 27 as described more fully hereinafter.

The cylinder 31 is actuated to extend the piston rod 32 and toggle joint elements 33 and 34. Upon full extension of toggle elements 33 and 34 the center pivot 30 extends slightly over center against the thrust buttress 29 and shock stresses are then transmitted into the machine frame 16 as best seen schematically in FIG. 4 and such shock is isolated from the cylinder 31. This accomplishes closure and lifting engagement with the closure element 13 as the push rod 35 moving in the lineal sleeve bearing 35a lifts the tooling 14 into ultimate seal registry contact with the closure element 12 and monitored by limit switch 36 which prevents fuel charging to the vessel if it is not sealed. Limit switch 36 can be placed opposing the end of rod 32. In this way the tooling holder stations 20 and indexing element or table 19 is not in a thrust bearing relationship with the tooling 14 during exposure of the chamber 11a in the tooling 14 to transient shock because the tooling 14 is closed and supported by the closure elements 12 and 13 and lifted from the tooling holder stations 20. After processing, the cylinder 31 reverses and the tooling 14 is restored to the tooling station 20. The table 19 is then indexed presenting the successive tooling station 20 for treatment.

In the FIG. 1 the silhouette limit switch 37 provides a position monitor for the articles placed on or in the tooling 14 to assure proper loading of the work pieces 10 prior to indexing into station 11. The frame 16, also supports a control cabinet 38 in which electrical circuitry is conveniently located for access and service. Hydraulic and fuel supply systems (not shown) are provided remote from the device. The present invention is not directed to the controls per se and a variety of interrelated electrical, mechanical, pneumatic and hydraulic controls well known in the art may accomplish the control and synchronization. The limit switches as described are merely control system monitors and sense conditions for appropriate sequencing.

Figure 3:
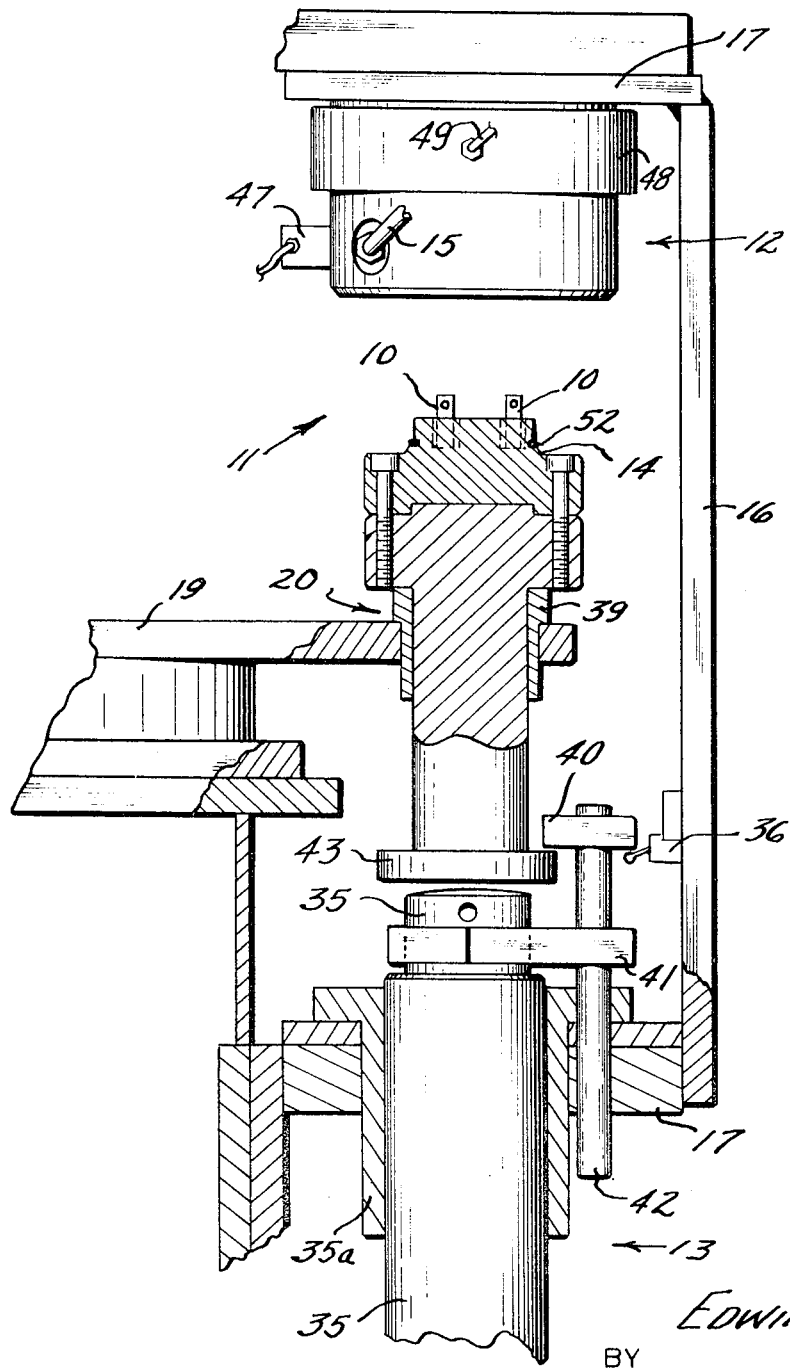
FIG. 3 is an enlarged partial section view (in a somewhat schematic form) showing an elevation view of tooling positioned prior to closure at the work station.

In FIG. 3 the work station 11 is best understood in reference to the closure element 13 in relation to tooling 14 in the station 20 socket of the table or holder 19. The tooling 14 is axially reciprocable in the bushing 39 secured in the station 20 of the table 19. The tooling 14 is in axial contact registry with the rod 35 of the closure element 13. The limit switch 36 is in interference relation with the spaced apart trip elements 40 and 41 secured to rod 35 and reciprocal therewith on guide rod 42. The rod 42 moves guidably through the jaw plate 17. The trip 40 is also in an interference path with pressure plate 43 so that it reciprocates in accord with axial movement of the pressure plate 43 as it is lifted or lowered by the thrust rod 35.

In FIG. 4 the charging features of the present apparatus are schematically shown which deliver high energy fuel to the cavity or chamber 11a in tooling 14 and in the closure element 12. The chamber 11a is sealed by abutting female member surface 50 to male tooling element surface 51 with interposed seal 52. In order to protect the removable or replaceable seal 52, the lower part 53 of the female closure member 50 is precision fitted to surface 51 of the tooling 14. This embodiment is particularly preferred since it allows the use of replaceable seals which are inexpensive. The replaceable seals 52 are shielded from the direct effect of the thermal release, thus increasing their useful life. The movable closure element 13 elevates support element 45 in table or holder 44. Usually the fuel mixture comprises a gas such as hydrogen or methane mixed with oxygen in ratios which provide a combustible mixture. However, other combustible gases in explosive mixes can be used, for example, propane, butane, and the like. The gases are fed separately to the gas receiving chambers 101 and 102, respectively and are acted upon by pistons 26a and 27a driven by hydraulic cylinders 26 and 27, respectively. The gas filled closed chamber 11a is fired by an initiating means such as a spark plug 46 mounted to fire in a conduit 47 attached to the fixed closure element 12. A coolant manifold 48 and coolant inlet 49 are provided in the closure element 12 (FIG. 3).

Separate and remote sources of gas, for example oxygen and hydrogen in pressurized bottles or cylinders are connected to the lines 103 and 104, respectively. The storage tanks or cylinders, not shown, are preferably remotely located from the apparatus of the present invention and preferably are separated from each other. In most instances storage is outside of a plant or building where chance escape of gases cannot cause serious concentrations or explosive environments to develop. A shut off valve 105 and 106, respectively, is provided in the lines 103 and 104. The lines 103 and 104 are disconnect coupled to the respective line extensions 107 and 108 by disconnects 109 and 110. Filter cartridges 111 and 112 are provided to filter the gases flowing in the lines 107 and 108, respectively. Solenoid operated valves 113 and 114 are provided in the lines 107 and 108, respectively, and pressure gages 115 and 116 are interposed between the filters 111 and 112 and solenoid valves 113 and 114 indicating entry pressure and reflecting the condition of the supply source. Pressure regulator valves 117 and 118 are in series with lines 107 and 107a and lines 108 and 108a respectively regulating the gas pressures in lines 107a and 108a. Solenoid valves 119 and 120 are in sequence in the lines 107a and 108a, respectively. The second solenoid valves 119 and 120 are normally closed but upon energization of the solenoid they allow flow in the respective lines 107 and 108. Check valves 121 and 122 are used to prevent gas return from the gas receiving chambers 101 and 102 during compression of the gas by pistons 27a and 26a, respectively. Leading from the charging chambers 101 and 102 are lines 123 and 124 with check valves 125 and 126 and solenoid controlled hydraulic actuated valves 127 and 128.

The supply lines 107 and 108, respectively, deliver the gases to the charging chambers 101 and 102, respectively. Upon compression by the respective pistons 27a and 26a the still separated gases are delivered as through the respective lines 123 and 124 to the confined space 11a formed by the closure element 12 and tooling 14, where the gases mix. It will be appreciated that as the pistons 27a and 26a advance they displace the gases in chambers 101 and 102, respectively. As will be appreciated the feed lines 107 and 107a are parallel to lines 108 and 108a to each other in the diagram of FIG. 4 and are similarly provided with flow control apparatus as described and the odd reference numerals relate to apparatus in the line 107 and 107a and the even reference numerals relate to the apparatus in line 108 and 108a. They differ in serving different gases as for example oxygen and hydrogen. The mixture may also occur in a mixing chamber (not shown) above the cavity containing the work pieces 10.

OPERATION

The apparatus of the present invention particularly comprises tooling transfer or handling means for the tooling, a means to close the tooling while preventing a thrust relationship with the handling means and to confine an explosive force therein and means to inject and propagate a transient thermal energy release in the void space in the cavity defined by the tooling and closure. Initiation means are required and devices to accomplish satisfactory repetitive sequencing are preferably provided. In automatic and semi-automatic operation the tooling is indexed and cycled to position between the closure elements an additional station or stations are provided for loading articles for subsequent cycles.

Accordingly the machine frame is sturdy enough to receive and dissipate all shock loading on the tooling since the jaw portions each provide juxtaposed thrust surfaces and closure elements are coaxially aligned in spaced apart relation in each of the thrust surfaces and at least one of the closure elements is movable toward and away from the other of the closure elements to form, upon closure, a chamber having rigid walls. A holder having a plurality of work stations successively and repetitiously registrably aligns in a work station between the closure elements and the article support element is movable in the holder and is engageable with the other of said closures to provide a sealed vessel capable of withstanding an explosive pressure surge upon seal contact. Fuel conduits lead into the vessel and initiating means is in selectively operable ignition contact with the interior of said vessel. When the vessel is closed and sealed the seal withstands the explosive shock and the closure transmits the shock into the machine frame.

In a typical cycle, parts to be treated are singly or multiply loaded into a tooling cavity. The tooling, including the parts, is thereupon indexed to a registering position between a pair of closure elements. The tooling is thereupon moved into closed and sealed holding contact supported by the machine frame. Upon closing a transient thermal energy release is provided which permeates the void space in the chamber and around the part in the sealed cavity of the tooling. The preferred generation of the transient thermal energy release is by means of the injection of an admixture of combustible gases which mixture is forced into the chamber provided by the tooling, and then initiated or detonated as by a spark. The propagation of the ensuring detonation is wholly confined. Then the closure is opened and the tooling is indexed to an unloading station while the same motion presents another substantially similar tooling element to the work station. Cyclic rates of 300 to 500 per hour are easily achieved.

The sequencing is accomplished using limit switches as position monitors and signalling the operation of electrical, pneumatic, mechanical and/or hydraulic components to accomplish the desired sequencing. The controls per se form no part of the present invention and a variety of well known sequence monitors and control circuits may be employed as well known in the art to accomplish the synchronization movements and sequences described. Briefly stated, the operational sequency occurs as follows: (a) the workpieces are loaded into the tooling (b) the loaded tooling is presented at the work station for closure (c) the closure is accomplished against a seal and forming a rigid chamber (d) upon sealing the chamber is charged and the charge is isolated from the charging sources (e) the charge is initiated and a selected dwell is provided (f) the tooling is opened and (g) the tooling is indexed for removal of processed work pieces and a new tooling loaded element is presented to the buttress position at the work station.

While generally described to accommodate an explosive reaction as between the admixture of gases within the chamber, the high energy transient thermal energy release can be remotely generated and can be transmitted to the tooling cavity. In such an instance, for example, the gas feed circuits of FIG. 4 would fire on one side of a free piston and the consequent transient high energy thermal pulse would be communicated to the tooling by compression of air or other gas on the other side of the free piston through conduits leading to the closed chamber.

I claim:

1. The apparatus for removal of superfluous projections from articles of manufacture which comprises:
  a. a frame structure providing two spaced apart axially aligned buttresses;
  b. a first closure element secured to one of said buttresses;
  c. a second closure element secured to the other of said buttresses at least one of said closure elements being movable toward and away from the other of said closure elements;
  d. an article mounting platform intermediate said closures and defining a fully enclosed and sealed space with one of said closure elements upon closure element movement;
  e. holder means mounting said platform for linear journalled movement of the platform in forming the enclosed sealed space;
  f. toggle means with a center pivot point between toggle joint elements connected at opposite ends to the movable closure element and the frame so as to axially close the closure elements upon extension of the toggle means by movement of the center pivot point slightly over center of the axis of alignment of the movable closure element;
  g. a thrust buttress connected to the pivot point which maintains the pivot point slightly over center so as to transmit axial stress on the movable closure element to the buttress;
  h. means for moving the center pivot point over center;

i. switch means activated upon the positioning of the pivot point over center and indicating closure of the closure elements with the platform to form the enclosed and sealed space;

j. conduit means leading in selected communication with said enclosed and sealed space openable only after activation of the switch means;

k. isolation means selectively closing said conduit means in resistance to transient elevated gaseous temperatures and pressures formed in said enclosed and sealed space;

l. supply means for a thermal energy releasing material connected through said conduit means and isolation means to said enclosed and sealed space; and m. initiating means for generating transient elevated gaseous temperatures and pressures in said thermal energy releasing material provided in said enclosed and sealed space.

2. The apparatus of claim 1 wherein the holder means supports multiple tooling registrably and successively locatable between one axis of said frame buttresses in line with said closure elements.

3. The apparatus of claim 2 wherein the support means is a circular table with the tooling around the circumference of the table.

4. The apparatus of claim 1 wherein said closure elements close, said conduit means open admitting the thermal energy releasing material from the supply means to the enclosed sealed space and then are closed by said isolation means, the initiating means is energized and said closure elements are opened after suitable exposure in said enclosed space to transient elevated temperatures and pressures in a repeated control sequence between said buttress elements of said frame.

5. The apparatus of claim 1 wherein said platform includes a pressure sealing ring.

6. The apparatus of claim 1 wherein the holder means includes a bearing for sleeved fit with a portion of the article mounting platform.

7. The apparatus for the removal of superfluous projections from articles of manufacture which comprises:

a. a thrust resisting frame having a pair of juxtaposed spaced apart thrust surfaces;

b. closure elements in axially aligned spaced apart relation in each of said thrust surfaces at least one of said closure elements being movable axially toward and away from the other;

c. a holder coaxially alignable between said closure elements;

d. an article support element movable in said holder and coaxially aligned with said closures, the movable of said closures disengaging said support element from axial thrust relation to said holder to provide a sealed and rigid vessel capable of withstanding an explosive high pressure surge upon confining contact with said other of said closures;

e. toggle means with a center pivot point between toggle joint elements connected at one end to the movable closure element and at the other end so as to axially close the closure element upon extension of the toggle means by movement of the center pivot point slightly over center of the axis of alignment of the movable closure element;

f. a thrust buttress connected to the pivot point which maintains the pivot point slightly over center so as to transmit axial stress on the movable closure element to the buttress;

g. means for moving the center pivot point over center;

h. switch means activated upon the positioning of the pivot point over center and indicating closure of the closure elements with the platform to form the enclosed and sealed space;

i. fuel introducing conduits leading into said vessel openable only after actuation of the switch means; and j. a selectively operable explosion initiating means in communication with the interior of said vessel.

8. The apparatus for high thermal energy treatment of articles to remove superfluous projections which comprises:

a. a thrust resisting frame having a pair of juxtaposed spaced apart thrust surfaces;

b. closure elements in axially aligned spaced apart relation in each of said thrust surfaces at least one of said closure elements being movable axially toward and away from the other;

c. an article support element having a male member engaging a corresponding female member of one of the closure elements under pressure upon actuation of the movable closure element to provide a closed vessel;

d. replaceable seal means between said male member of the support element and said female member of the closure element forming the vessel positioned so that precision fitted parts of the male and female members are between the seal and the chamber;

e. toggle means with a center pivot point between toggle joint elements connected at one end to the movable closure element and at the other end so as to axially close the closure element upon extension of the toggle means by movement of the center pivot point slightly over center of the axis of alignment of the movable closure element;

f. a thrust buttress connected to the pivot point which maintains the pivot point slightly over center so as to transmit axial stress on the movable closure element to the buttress;

g. means for moving the center pivot point over center;

h. switch means activated upon the positioning of the pivot point over center and indicating closure of the closure elements with the platform to form the enclosed and sealed space;

i. fuel introducing conduits leading into said vessel openable only after actuation of the switch means; and j. a selectively operable explosion initiating means in communication with the interior of said vessel.

9. The apparatus of claim 8 wherein said male and female members are annular with a ring seal disposed therebetween.

10. The apparatus of claim 9 wherein the male member supports the sealing ring.

* * * * *